Dec. 8, 1964   J. A. GENTILUOMO   3,160,450
THRUST BEARING
Filed Nov. 16, 1962   4 Sheets-Sheet 1

INVENTOR.
JOSEPH A. GENTILUOMO
BY *Joseph P. Flanagan*
atty

INVENTOR.
JOSEPH A. GENTILUOMO
BY Joseph P. Flanagan
atty

INVENTOR.
JOSEPH A. GENTILUOMO

INVENTOR.
JOSEPH A. GENTILUOMO

United States Patent Office
3,160,450
Patented Dec. 8, 1964

3,160,450
THRUST BEARING
Joseph A. Gentiluomo, Schenectady, N.Y., assignor to Mechanical Technology Incorporated, Latham, N.Y., a corporation of New York
Filed Nov. 16, 1962, Ser. No. 238,122
4 Claims. (Cl. 308—160)

The present invention relates to thrust bearings and more particularly to thrust bearings of the self-equalizing type. The latter type of thrust bearings have heretofore been known and have found wide use in various types of installations where a rotating shaft, for example, due to its axial movement, generates an axial thrust, such installations including but not being limited to marine propulsion shafts, generators, power transmission clutches, disc type brakes and the like.

Self-equalizing thrust bearings generally contain as basic elements a plurality of segmental shoes against which a collar, which may be in the form of a rotating plane keyed to a rotating shaft, presses. A base, either fixed or rotating with the shaft, which is common to all the segmental shoes, supports an equalizing means which in turn supports the shoes which have their collar engaging surfaces composed of such material as desired to increase or decrease the friction therebetween as may be preferred in accordance with the intended use of the bearing.

The self-equalizing means of prior similar thrust bearings have taken various forms such as springs, annular concentric pistons, interengaging balls, the well known leveling plates of the Kingsbury type bearing, and the like. Such prior art devices have certain undesirable characteristics, however, among which may be mentioned the excessive axial deflection of spring type thrust bearings, and the undue frictional resistance in, and large amount of machining necessary to manufacture, such other mentioned types of equalizing means. In addition, such prior art bearings are frequently objectionable in that they are not as effective as may be desired in attenuating noise and vibrations transmitted thereto.

To overcome the above noted disadvantages of prior similar devices, and to provide advantages not heretofore found in such devices, I have sought to provide a self-equalizing thrust bearing wherein frictional losses beteeen various elements of the equalizing means are reduced, axial deflection is kept to a minimum, the various components require little in the way of intricate machining, and wherein the equalizing function is carried out among the various elements thereof continuously, immediately, and inevitably, to equalize the load on any and all shoes, and wherein no action on any one shoe thereof can take place without having an effect on other shoes of said bearing. Further, in at least one embodiment of my improved self-equalizing thrust bearing, the equalizing means comprises a fluid filled chamber which serves to effectively attenuate vibrations and noise which may be transmitted thereto during operation.

The instant invention is properly defined in a number of mechanical embodiments, two such being illustrated in the drawings forming part of this application. It is to be understood, however, that the drawings serve purposes of illustration only and are not to be construed as limiting my invention, reference being had to the appended claims for that purpose.

Accordingly, referring to the drawings in detail, wherein like reference characters are employed to designate like parts in the several figures.

Figure 1:
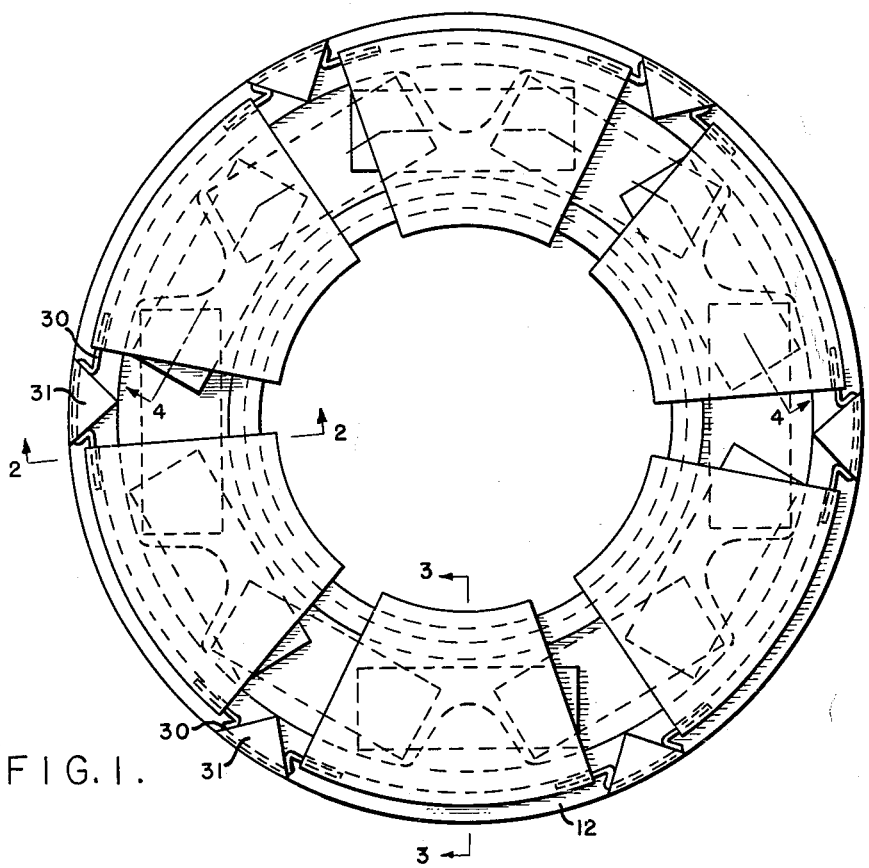
FIGURE 1 is a plan view showing one embodiment of my improved thrust bearing.
Figure 2:
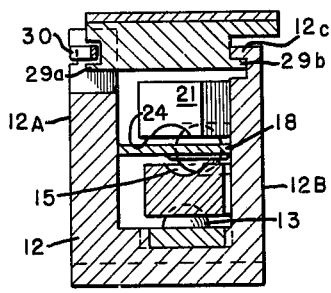
FIGURE 2 is a sectional view taken along the line 2—2 of FIGURE 1.
Figure 3:
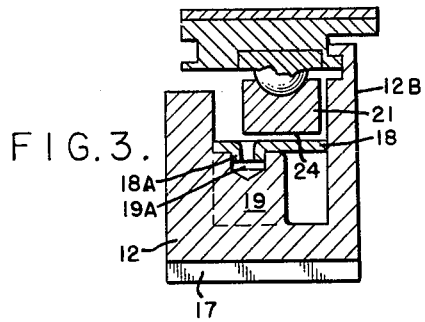
FIGURE 3 is a sectional view taken along the line 3—3 of FIGURE 1.

In the embodiment shown in FIGURES 1 to 4 the circular base member, which is generally indicated by the arrow 12, is substantially U shaped in cross section as seen in FIGURE 3, has a plurality of radially extending lubricating channels 17 spaced equidistantly about its lower surface, and is provided with a plurality of suitable pivot balls 13 which may be integrally formed therein or take the form of inserts. Each such pivot ball 13 has a rocker arm 14 pivotally mounted thereon, each of said rocker arms having a raceway 15 running lengthwise along its upper surface. Two ball bearings such as the bearings 26′ and 27 are movably maintained in each of said raceways by means of a cage member 18 which is fixedly supported in place in base member 12 by means of plurality of projections 18A which fit into depressions 19A of bosses 19 formed in said base member 12, all as more clearly shown in FIGURE 3.

Figure 4:
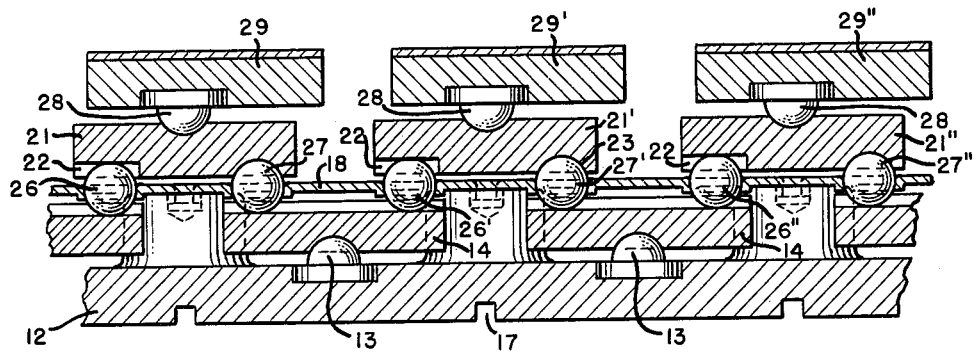
FIGURE 4 is a developed diagrammatic view taken along the line 4—4 of FIGURE 1.

A plurality of rocker arms 21, each of which has a raceway 22 and depression 23 formed in its under surface 24, are movably mounted atop said ball bearings, each such latter arm cooperating with two adjacent ball bearings such as 26′ and 27′, respectively, each of said latter ball bearings being maintained in operative relationship with different rocker arms 14 as shown in FIGURE 4. All of the ball bearings above mentioned are free to move along the axis of the holes, one for each such bearing, formed in cage member 18, the extent of such movement being limited, however, by the cooperation of arms 14 and shoes 29 with base member 12 to keep said ball bearings positioned within the longitudinal limits of raceways 15 and 22.

Located in the upper surface of each rocker arm 21 is a depression into which fits a suitable pivot ball 28, said latter pivot ball being formed integrally with or being an insert in one of a series of thrust pads or bearing shoes 29.

A series of spring clip members 30 which engage around triangular shaped bosses 31 formed atop and spaced circumferentially equidistant around upstanding outer wall 12A of base member 12 serve as retainers for shoes 29. The members 30 do not normally engage shoes 29, as clearly seen in FIGURE 2, but should the bearing be, for example, capsized during handling the spring members 30 would engage the shoes to keep them from becoming separated from the bearing assembly. As shown in FIGURES 2 and 3, flanges 29A and 29B formed on shoes 29 normally underlay spring members 30 and flange 12C formed on base ring 12, respectively. It will be observed, in FIGURES 1 and 2, that shoes 29 are free to move, with respect to base member 12, pivotally as well as axially; in the former direction about their respective pivotal mountings on arms 21, and in the latter direction in conformity with the action of the equalizing means, all as more particularly described below.

In the construction above described, it is intended that all like elements will conform to each other in size, strength and other structural characteristics as nearly as practicable. Also, of course, the bearing surfaces may be of various materials. For example, stainless steel would be a satisfactory bearing composition where water served as the lubricant while, where other types of lubricant are used, the composition of bearing materials as are presently found in conventional thrust and radial bearings, using such other lubricants, would be utilized.

Assembly of the above described bearing would be accomplished as follows: A plurality, six in the embodiment shown, of pivot ball inserts 13 are pressed into the base ring 12, one rocker arm 14 is placed on each such insert, the cage member 18 is set into place in bosses 19, twelve ball bearings are placed in the cage holes, one in each hole, six rocker arms 21, 21', 21'', etc. are placed on the ball bearings, a thrust pad or shoe 29 with its associated pivot ball 28 is placed on each rocker arm 21 and, finally, spring clip members 30 are positioned as shown in FIGURES 1 and 2 to retain the shoe members. The bearing assembly may now be encased in any suitable housing, one such being that shown in FIGURE 8 and described below.

With the construction above described, it will be seen that I have provided a self-equalizing thrust bearing wherein an unequal thrust load imposed on any one bearing shoe member will be spread out over all the shoe members in such a bearing in an endless chain. For example, referring to FIGURES 4 and 8, assuming a greater downward load is imposed on shoe 29' than on shoes 29'' and 29, the additional downward force on rocker arm 21' will depress ball bearings 26' and 27', which in turn will pivot their respectively attendant rocker arms 14 clockwise and counterclockwise respectively. These arms 14 will, in turn, through ball bearings 27 and 26'', respectively, cause arms 21 and 21'' to move shoes 29 and 29'' in the direction of the thrust collar 104, FIGURE 8, until the load on all 3 shoes 29, 29' and 29'' is equalized. The above described action continues, ad infinitum, and it will thus be appreciated that the added greater thrust load originally applied to any one shoe can not be carried in any other way except by balancing said load against another, and another, and still another in an endless chain. Such self-equalization will take effect as soon as any thrust load is placed on the bearing, and will automatically continue whenever, during operation, thrust loads are not evenly distributed among the various shoes.

Figure 5:
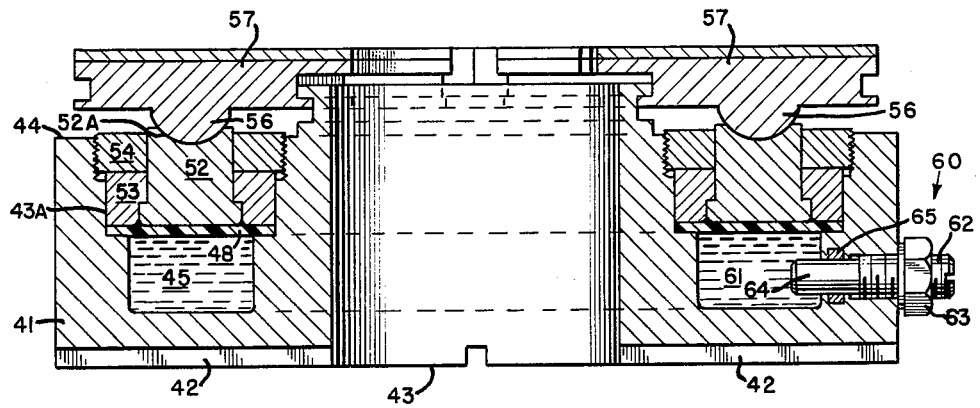
FIGURE 5 is a sectional view taken along the line 5—5 of FIGURE 7.
Figure 7:
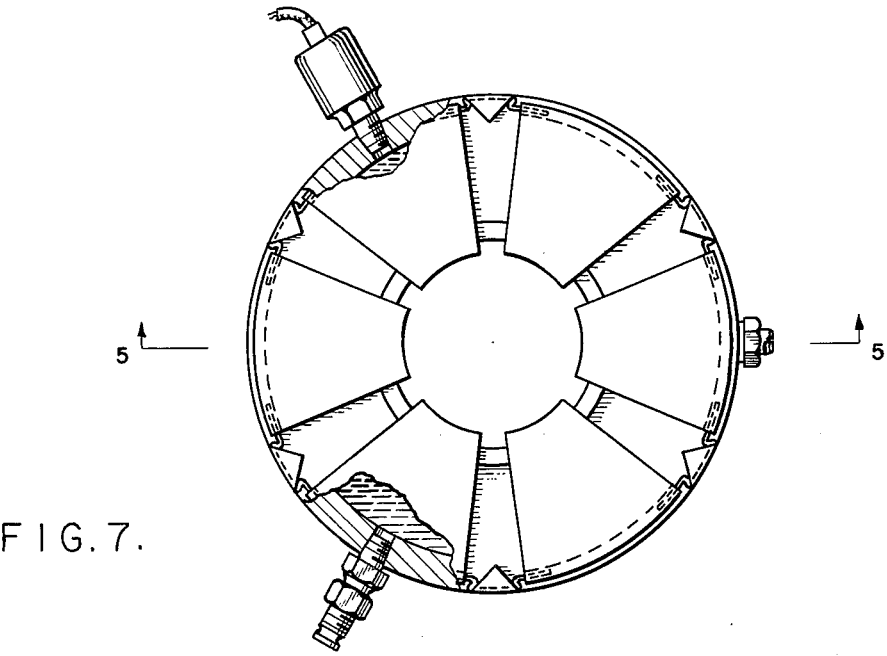
FIGURE 7 is a plan view of the bearing shown in FIGURE 5.

FIGURES 5 and 7 disclose a second embodiment of my invention comprising a fluid filled chamber to effect equalization of thrust loads imposed thereon, while at the same time serving to attenuate vibrations and noise which may be transmitted to this bearing during its use. In this embodiment base member 41 may be a cast ring having a plurality of radially extending lubricating channels 42 spaced equidistantly about its lower wall 43, and having a plurality of holes 43A formed in its upper wall 44, said holes being spaced equidistantly therearound, and each terminating, at one end, in a fluid chamber 45 common to all such holes.

A series of flexible diaphragms 48 of any suitable material are positioned, one in each hole, atop flanges formed integral with base ring 41, each such diaphragm supporting a movable flanged piston member 52. Each of said piston members is maintained in its normal position as seen in FIGURE 5 by means of a flanged retaining ring 53 and an externally threaded ring 54, which latter ring cooperates with corresponding threads formed in upper wall 44 of base member 41 at one end of each of the holes 43A.

Each of the pistons 52 has a depression 52A formed in one end thereof into which fits, for pivotal movement therein, a pivot ball 56 which may be an insert in or formed integral with a thrust pad or shoe 57.

The various shoes 57 are similar to those shoes 29, 29', and 29'' shown and described in connection with FIGURES 1 to 4, and are maintained in normal position in base member 41 by means of cooperating flanges and spring clip members in a manner similar to those in FIGURES 1 to 3, all as more particularly described hereinabove.

Keeping in mind that the structural characteristics of all like elements will conform to each other in size, strength, and other characteristics as nearly as practicable, the bearing of FIGURES 5 and 7 operates as follows: The various shoes 57 will transmit thrust forces applied thereto via the pistons 52 and diaphragms 48 thereby tending to displace the fluid 61 in chamber 45. Since the chamber 45 is filled with fluid, and all like elements in the bearing have the same structural characteristics, it will be appreciated that no one shoe will be allowed to continuously sustain an unequal thrust force relative to any other shoe inasmuch as a common pressure will always exist throughout fluid 61. If any shoe in the system is bearing an unequal load, for example a greater load than any other shoe, the pressure generated by said first shoe will cause said other shoe to be displaced until it carries an equal share of the load. Of course, if more than one shoe is not bearing an equal load, all of such shoes will, in like manner, be displaced until an equal load is brought to bear thereon.

It will be appreciated that this latter described bearing will tend to be more silent in operation than the bearing of FIGURES 1 to 4 due to the fact that the number of moving parts has been substantially reduced.

An adjusting means generally indicated by the arrow 60 cooperates with the fluid 61 in chamber 45, whereby any pre-load force acting on the fluid 61 may be varied. Such means comprises a threaded bolt 62 which threads into a threaded bore formed in the base member 41. A lock nut 63 is provided which threads onto bolt 62, said bolt abutting one end of a piston 64 positioned in said bore formed in base ring 41. The piston 64 is axially movable in said bore and is provided with any suitable sealing means 65 located in a chamber formed around piston 64. Adjustment of bolt 62 along its axis in a radially inwardly or outwardly direction will likewise adjust piston 64 to thereby vary the preload force on the fluid in chamber 45. Lock nut 63 functions in the well known manner to secure bolt 62 in its adjusted position.

In FIGURE 7 I show a conventional pressure transducer and bleed valve cooperating with the fluid 61 in chamber 45. These items are conventional in form and operation, and their function and characteristics will be obvious to those skilled in the art.

Figure 6:
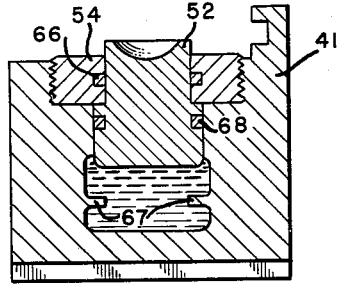
FIGURE 6 is a view showing a modified form of part of the structure of FIGURE 5.

It will be appreciated that the diaphragms of FIGURE 5 could be dispensed with and the pistons 52 could act directly on the fluid 61 as shown in FIGURE 6. In this latter instance, suitable sealing means 66, 68 would be provided for cooperation with each piston 52 and projections 67 may be formed integral with base ring member 41 to limit downward movement of pistons 52.

Figure 8:
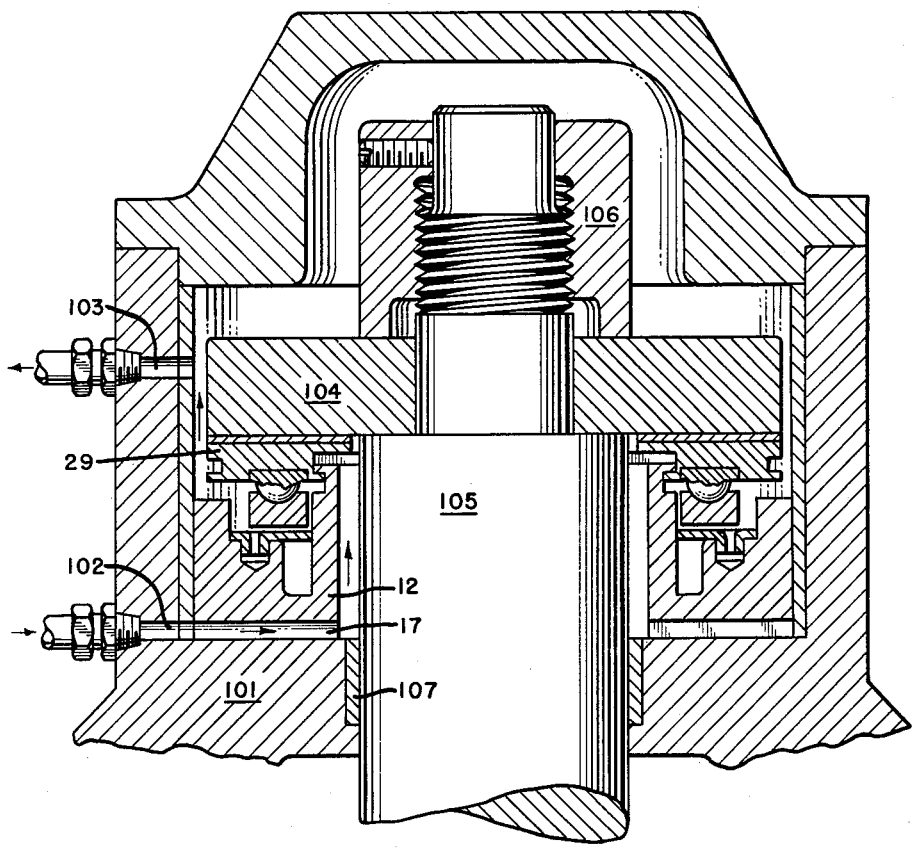
FIGURE 8 is a view, in section, showing one form of installation of my improved thrust bearing.

In FIGURE 8, I have shown one manner which my improved self-equalizing thrust bearing may be housed. Although the bearing of FIGURES 1 to 4 is here shown, a similar housing, modified as necessary as will be apparent to those skilled in the art, or any other suitable housing dictated by the needs of various applications, may be utilized for any other embodiment. Also, the bearing may be utilized in conjunction with shafts mounted on other than a vertical axis. In FIGURE 8, base member 12, with its associated bearing assembly, is non rotatably mounted within and supported by housing member 101. Member 12 may be rendered non rotatable within housing 101 by the use of dowels or key means, not shown, cooperating with both members in a manner well known in the art.

Housing member 101 is provided with lubricant inlet and outlet ports 102 and 103, the latter serving to maintain the lubricant within the housing at a predetermined level whereby the mating surfaces of shoes 29 and a collar 104 are kept lubricated. The lubricant passes through channel 17 formed in base ring 12, in the direction of the arrows, leakage being prevented by seal 107, to lubricate the bearings and eventually pass out port 103. Shaft 105 is supported from a bushing 106 which, in turn, is supported on collar 104, the latter rotating with said shaft and being supported by shoes 29.

In operation, any thrust forces transmitted to shoes 29 via collar 104 will be equalized by the bearing as described hereinabove and transmitted through base member 12 to housing 101.

In light of the above description it will be appreciated that my invention, in the shown embodiments thereof, provides a relatively simple thrust bearing of the self-equalizing type in which frictional resistance between the various elements thereof is kept to a minimum, axial deflection of the components thereof is reduced compared to certain other types of similar bearings, and wherein little is required in the way of intricate machining in forming the various elements thereof. Also, it will be seen that in all forms of my bearing the equalizing function is carried out among the various elements thereof in an efficient manner to equalize the load on any and all shoes continuously, immediately, and inevitably, and no action can take place with respect to any one shoe thereof without affecting all other shoes therein.

Obviously many modifications and variations of the present invention are possible in the light of the above teachings. It is, therefore, to be understood that, within the scope of the appended claims, the invention may be practiced otherwise than as specifically described.

Having thus described the invention, what is claimed is:

1. In combination with a rotating shaft and thrust collar, a self-equalizing thrust bearing comprising a base ring, equalizing means located within said base ring, a plurality of thrust receiving members operatively connected to said equalizing means, said equalizing means including a plurality of pivot members attached to a surface of said base ring, first means engaging and supported by said pivot members, a depression formed in each element of said first means, a plurality of ball bearings located in each said depression, a second means engaging and supported by said ball bearings, said second means having a plurality of depressions formed in each element thereof with certain of said plurality of depressions accommodating said ball bearings and another of said plurality of depressions accommodating a pivot member, each said pivot member engaging and supporting one of said thrust receiving members for movement in more than one plane.

2. The invention of claim 1 wherein each of said elements of said first means is a rocker arm, said depression formed in one surface thereof extending longitudinally thereof.

3. The invention of claim 1 wherein each of said elements of said second means is a rocker arm, one of said ball bearing accommodating depressions extending longitudinally thereof.

4. The invention of claim 2 wherein each of said elements of said second means is a rocker arm, one of said ball bearing accommodating depressions extending longitudinally thereof.

References Cited in the file of this patent
UNITED STATES PATENTS

| | | |
|---|---|---|
| 1,425,979 | Kingsbury | Aug. 15, 1922 |
| 2,874,007 | Cametti et al. | Feb. 17, 1959 |
| 2,906,571 | Casacci | Sept. 29, 1959 |